Patented Mar. 16, 1943

2,313,755

UNITED STATES PATENT OFFICE 2,313,755

METHOD OF PRODUCING PROTECTIVE COATINGS UPON MAGNESIUM AND ITS ALLOYS

William S. Loose, Midland, Mich., assignor to The Dow Chemical Company, Midland, Mich., a corporation of Michigan No Drawing. Application December 2, 1938, Serial No. 243,524

11 Claims. (Cl. 148—6)

The invention relates to methods of producing protective coatings on articles of magnesium and its alloys. It more particularly concerns an improved method of producing coatings of the aforesaid type which are highly resistant to corrosive attack.

Various methods have been proposed heretofore for producing protective coatings on magnesium and its alloys by subjecting articles thereof to the action of chemical solutions, among which the aqueous solutions of certain of the oxygenated inorganic compounds which produce adherent coatings are the most widely used, such as aqueous solutions containing the chromates or bichromates of alkali metals.

I have found that new and greatly improved results are obtained if, after treating the article with an aqueous solution of an oxygenated inorganic compound, it is then subjected to the action of water to which has been added a compound of arsenic. The invention, then, consists of the method hereinafter fully described and particularly pointed out in the claims.

In carrying the method into effect, the article to be treated is first cleaned, if necessary, as by wire brushing or pickling in a dilute mineral acid which is capable of forming water-soluble salts of magnesium, such as nitric or sulphuric acid. The cleaned article is then, according to the invention, subjected to the action of a solution containing an oxygenated inorganic compound selected from the group consisting of the alkali metal and ammonium salts of the oxy-acids of the elements chromium, molybdenum, phosphorus, selenium, titanium, tungsten, and vanadium. The aqueous solutions of these compounds react with magnesium to produce insoluble compounds therewith, either directly or upon the compound being reduced by the action of the metal to form an insoluble magnesium compound. The following are typical examples of such salts: sodium chromate and bichromate, ammonium molybdate, the sodium phosphates, ammonium selenate, sodium titanate, sodium tungstate, and sodium vanadate.

The oxygenated compound may be employed in aqueous solutions having various pH values, best results being obtained when the pH value of about 10.2 is avoided which is the pH value corresponding to the formation of magnesium hydroxide by precipitation. For example, the pH value of the bath may lie advantageously either between about 0.5 and 8 or between about 12 and 14. The concentration in which to employ the oxygenated compound varies more particularly with the pH at which the solution is to be used and may also be limited by the solubility of the particular oxygenated compound employed. In the lower range of pH values a considerable concentration of the oxygenated compound may be employed as, for example, from about 5 to 40 per cent by weight, while at the higher range of pH values only a relatively low concentration is desirable, such as from about 0.1 to 4 per cent of oxygenated compound, although in some instances as much as 10 per cent may be used. The pH value of the solution may be lowered or raised, if desired or necessary, by adding either an acid such as sulphuric acid, or an alkali, preferably of the alkali metals, such as sodium hydroxide, respectively, thus regulating the pH of the solution of the oxygenated compound to a value between about 0.5 and 8 or between about 12 and 14, as desired. In the foregoing ranges of pH values, it is preferable to use from 4 to 6 in the lower range and from 13 to 14 in the higher range.

The duration of the treatment in the solution containing the oxygenated compound varies with its temperature, concentration, and pH value. In general, a treatment of from 5 to 60 minutes and preferably from 30 to 45 minutes at or near the boiling temperature of the solution produces satisfactory results. Similar results can be obtained at temperatures up to 70° C. and in from 5 minutes to one hour by making the article the anode and electrolyzing in a solution having a pH between 0.5 and 8, with a current density of from 5 to 50 amperes of anodizing current per square foot of surface. When the pH of the solution is between 12 and 14, superior results are obtained, particularly if the voltage employed is above 15. If desired, an alkaline solution can be used for the anodization, as by adding about 2 per cent of sodium hydroxide to the solution containing the oxygenated compound. Suitable concentrations in which to employ the oxygenated compound for best results when the article is to be anodized vary with the specific compound used as follows: with chromates, the concentration may be about 0.2 per cent; with molybdates, about 5 to 6 per cent; phosphates, about 3 per cent; selenate, about 1 per cent; titanate, about 1 per cent; tungstate, about 3 per cent; and vanadate, about 5 per cent, although other concentrations may be used.

After having produced a coating by the action of an aqueous solution of the oxygenated inorganic compound, the article is preferably rinsed and then subjected to the action of water to which has been added an arsenic compound, preferably at the boiling temperature. The solubility of the arsenic compound in the water appears to be immaterial since relatively insoluble compounds, such as the sulphides of arsenic, may be employed. Other arsenic compounds are also effective such as arsenic acid, arsenious acid, arsenic fluoride, arsenic iodide, arsenious bromide, arsenious chloride, arsenious fluoride, arsenious iodide, arsenious oxy-chloride, the alkali metal and ammonium arsenates and arsenites, etc. A relatively small amount of such arsenic compound may be added to the water in which the article is to be treated, such as 1 per cent, although other quantities may be employed. Best results appear to be obtained when the pH of the solution is between about 5 and 8, but effective action can be obtained at other pH values, such as those lying between about 3 and 14. If the pH is below about 3, the magnesium of the article tends to decompose the arsenic compound in the bath with excessive rapidity, causing a rapid loss of the effectiveness of the bath. The pH of the bath may be regulated by adding either an acid, such as sulphuric acid, or an alkali, such as sodium hydroxide, according to whether it is desired to maintain the bath in acid, neutral, or alkaline condition, respectively. The solution may be employed at any ordinary temperature, including the boiling point. The duration of the treatment may be varied according to the effect it is desired to produce and may be from 5 minutes to an hour, for example.

I have further found that the resistance to corrosion of articles so treated is enhanced if prior to the foregoing method the article is first subjected to the action of a fluoride bath as, for example, an aqueous solution of a soluble fluoride. This treatment may be carried out by immersing the article in the fluoride bath or otherwise bringing the fluoride and the article into contact. For making up the fluoride bath, the soluble fluorides, such as hydrofluoric acid, the acid fluorides or the bifluorides, such as potassium bifluoride, ammonium bifluoride and the like, the neutral alkali metal fluorides, such as sodium and potassium fluorides and combinations of these, and some of the more complex fluorides may be used, such as fluosilicic acid and hydrofluoboric acid. Of these fluorides, I prefer to use those having an acid reaction as is obtained by dissolving hydrofluoric acid or an acid fluoride in water in a concentration of about 2 per cent or more by weight. A generally useful fluoride solution is a 25 to 30 per cent solution of hydrofluoric acid. Other concentrations may be used, if desired. The treatment with the fluoride bath may be carried on for from 1 to 60 minutes or more at ordinary temperatures. If desired, however, the temperature may be as high as 80° C. or even higher, whereby the action of the solution will be expedited provided excessive volatilization of HF from the solution does not occur. If the soluble fluoride bath contains mainly hydrogen fluoride, it is best to use the bath at about room temperature so as to avoid incurring a loss of HF, which is fairly easily volatilized from the solution at higher temperatures. The action of the solution also may be expedited, if desired, by applying a potential to the article, this being made the anode. A suitable voltage to employ is from 90 to 100 or more. At ordinary temperatures anodizing for from about 5 to 15 minutes in the fluoride bath as described will produce a satisfactory coating. Baths comprising a molten fluoride also may be used for depositing a fluorde coating, the article being made the anode, and electrolyzed to effect the deposition. Fused potassium or sodium fluoride, bifluoride, and mixtures of dehydrated boric acid with potassium bifluoride may be used at about 200° C. Voltages up to 220 may be used.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of producing a protective coating upon articles of magnesium and its alloys, the steps which comprise subjecting the article to the action of an aqueous solution containing a soluble salt selected from the group consisting of the alkali metal and ammonium salts of the oxy-acids of the elements chromium, molybdenum, phosphorus, selenium, titanium, tungsten, and vanadium, to form a coating on the article, and thereafter subjecting the coated article to the action of a bath comprising water and an arsenic compound to increase the corrosion resistance of the previously formed coating.

2. A process according to claim 1 wherein the soluble oxy acid salt is an alkali metal chromate.

3. A process according to claim 1 wherein the soluble oxy-acid salt is sodium bichromate and the solution thereof has a pH value between 0.5 and 8.

4. A process according to claim 1 wherein the arsenic compound is one which is relatively insoluble in water.

5. A process according to claim 1 wherein the aqueous solution of the arsenic compound has a pH value between 3 and 14.

6. A process according to claim 1 wherein the arsenic compound is a sulfide of arsenic.

7. In a method of producing a protective coating upon articles of magnesium and magnesium-base alloys, the steps which comprise subjecting the article to the action of a bath consisting essentially of fluoride to form a coating on the article, thereafter to the action of an aqueous solution of a soluble salt selected from the group consisting of the alkali metal and ammonium salts of the oxy-acids of the elements chromium, molybdenum, phosphorus, selenium, titanium, tungsten and vanadium to increase the corrosion resistance of the initial coating, and then to the action of a bath consisting essentially of water and an arsenic compound further to increase the corrosion resistance of the coating.

8. A process according to claim 7 wherein the fluoride bath comprises molten fluoride.

9. A process according to claim 7 wherein the fluoride bath is an aqueous solution containing a soluble acid fluoride.

10. In a method of producing a protective coating upon articles of magnesium and magnesium-base alloys, the steps which comprise subjecting the article to the action of a solution consisting essentially of aqueous hydrofluoric acid to form a coating on the article, thereafter to the action of a solution consisting essentially of water and a soluble chromate to increase the corrosion resistance of the initial coating, and then to the action of a bath consisting essentially of water and an arsenic compound to increase further the corrosion resistance of the coating.

11. A process according to claim 10 wherein the arsenic compound is a sulphide of arsenic.

WILLIAM S. LOOSE.